United States Patent
Kay et al.

(10) Patent No.: US 9,981,439 B2
(45) Date of Patent: *May 29, 2018

(54) SYSTEMS AND METHODS OF HEATING A FIBER PRODUCING DEVICE

(71) Applicant: CLARCOR Inc., Franklin, TN (US)

(72) Inventors: Stephen Kay, Austin, TX (US); Thomas D. Carr, Lakeway, TX (US); Carlos Alberto Gomez Jimenez, Edinburg, TX (US); Joe Moore, Austin, TX (US)

(73) Assignee: CLARCOR Inc., Franklin, TN (US)

( * ) Notice: Subject to any disclaimer, the term of this patent is extended or adjusted under 35 U.S.C. 154(b) by 1154 days.

This patent is subject to a terminal disclaimer.

(21) Appl. No.: 13/960,375

(22) Filed: Aug. 6, 2013

(65) Prior Publication Data

US 2014/0042651 A1    Feb. 13, 2014

Related U.S. Application Data

(60) Provisional application No. 61/680,109, filed on Aug. 6, 2012, provisional application No. 61/776,054, filed on Mar. 11, 2013.

(51) Int. Cl.
| | |
|---|---|
| *B29D 99/00* | (2010.01) |
| *D01D 5/18* | (2006.01) |
| *B29C 47/00* | (2006.01) |
| *B29C 47/12* | (2006.01) |
| *B29C 47/30* | (2006.01) |
| *C03B 37/04* | (2006.01) |

(52) U.S. Cl.
CPC ........... *B29D 99/0078* (2013.01); *D01D 5/18* (2013.01); *B29C 47/0014* (2013.01); *B29C 47/122* (2013.01); *B29C 47/30* (2013.01); *C03B 37/04* (2013.01); *C03B 37/045* (2013.01)

(58) Field of Classification Search
CPC .... B29D 99/0078; D01D 5/18; C03B 37/045; C03B 37/04; B29C 47/30; B29C 47/122; B29C 47/0014
USPC ........ 264/8, 211.12; 425/3, 8, 174.8 R, 72.2, 425/464, 382 R, 382.2–382.3; 219/620–672
See application file for complete search history.

(56) References Cited

U.S. PATENT DOCUMENTS

| | | | |
|---|---|---|---|
| 3,622,293 A | 11/1971 | Firnhaber | |
| 3,928,009 A * | 12/1975 | Perry | C03B 37/045 425/8 |
| 4,266,918 A * | 5/1981 | Manley | D01D 5/0069 264/441 |

(Continued)

FOREIGN PATENT DOCUMENTS

| | | |
|---|---|---|
| EP | 0 801 040 A2 | 10/1997 |
| WO | WO 91/13836 A1 | 9/1991 |

(Continued)

*Primary Examiner* — Nahida Sultana
(74) *Attorney, Agent, or Firm* — Reinhart Boerner Van Deuren P.C.

(57) ABSTRACT

Described herein are apparatuses and methods of creating fibers, such as microfibers and nanofibers. The methods discussed herein employ centrifugal forces to transform material into fibers. Apparatuses that may be used to create fibers are also described. Systems and methods of heating the fiber producing device, before and during use, are also described herein.

14 Claims, 14 Drawing Sheets

(56) References Cited

U.S. PATENT DOCUMENTS

| | | | | |
|---|---|---|---|---|
| 4,303,433 | A * | 12/1981 | Torobin | B01J 13/04 264/12 |
| 5,075,063 | A * | 12/1991 | Lenk | D01D 5/18 264/176.1 |
| 5,785,996 | A * | 7/1998 | Snyder | C03B 37/045 264/172.14 |
| 6,116,883 | A * | 9/2000 | Takeuchi | D01D 4/02 425/378.2 |
| 6,141,992 | A * | 11/2000 | Gross | C03B 37/048 65/522 |
| 6,504,271 | B2 * | 1/2003 | Chass | B60C 23/041 310/11 |
| 6,628,017 | B1 * | 9/2003 | Chass | H02K 35/06 310/11 |
| 7,513,766 | B2 * | 4/2009 | Peavey | B29C 47/0023 264/209.2 |
| 2002/0079610 | A1 * | 6/2002 | Uy | D01D 4/00 264/211.12 |
| 2005/0242679 | A1 * | 11/2005 | Walter | H02K 21/44 310/181 |
| 2006/0158055 | A1 * | 7/2006 | Ivtsenkov | H02K 21/24 310/156.01 |
| 2007/0261446 | A1 * | 11/2007 | Baker | C03B 37/04 65/453 |
| 2008/0242171 | A1 * | 10/2008 | Huang | D01D 5/0023 442/51 |
| 2009/0232920 | A1 * | 9/2009 | Lozano | D01D 5/18 425/72.2 |
| 2011/0059261 | A1 * | 3/2011 | Sumida | D01D 5/0061 427/459 |
| 2014/0159262 | A1 * | 6/2014 | Kay | D01D 5/18 264/8 |

FOREIGN PATENT DOCUMENTS

| WO | WO 2005/061763 A1 | 7/2005 |
|---|---|---|
| WO | WO 2007/089710 A1 | 8/2007 |

* cited by examiner

SYSTEMS AND METHODS OF HEATING A FIBER PRODUCING DEVICE

PRIORITY CLAIM

This application claims the benefit of U.S. Provisional Application No. 61/680,109 filed on Aug. 6, 2012 and U.S. Provisional Application No. 61/776,054 filed on Mar. 11, 2013, both of which are incorporated herein by reference.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857.

SUMMARY OF THE INVENTION

In some embodiments, a fiber producing system includes a body including one or more openings and a coupling member comprising an elongated conduit. The body may function to receive a material to be produced into a fiber. The material may be conveyed through the elongated conduit of the coupling member during use. The body may be couplable to a driver through the coupling member. During use, rotation of the body causes material in the body to be passed through one or more openings to produce microfibers and/or nanofibers.

In one embodiment, a microfiber and/or nanofiber producing system includes: a fiber producing device comprising a body comprising one or more openings and a coupling member, wherein the body is configured to receive a material to be produced into a fiber; an inductive heater positioned proximate to the fiber producing device such that, during use, the inductive heater induces an electrical current in the body, wherein the body is heated by the induced electrical current; and a driver capable of rotating the fiber producing device, wherein the fiber producing device is couplable to the driver through the coupling member. In an embodiment, the inductive heater is stationary with respect to the fiber producing device when the fiber producing device is rotated. During use rotation of the fiber producing device causes material in the body to be passed through one or more openings and ejected from one or more openings to produce microfibers and/or nanofibers.

In an embodiment, the body includes a channel. At least a portion of a coil of the inductive heater is positioned within the channel. The fiber producing device may also include an inductive transparent material disposed in the channel. An insulative layer may be coupled to a bottom surface of the body to help reduce heat lost to the ambient atmosphere.

An inductive heater is positioned proximate to the body to induce an electrical current in the body of fiber producing device. The body of fiber producing device thereafter becomes heated by the induced electrical current. In an embodiment, the body has features that modify the path of the induced current flow through the body. For example, in one embodiment, the shape of the body produces a homogenous distribution of current through the body.

In one embodiment, an inductive heater includes oppositely polarized magnets positioned on a surface of the body, and one or more permanent magnets electrically coupled to the polarized magnets. Rotation of the body causes a current to be induced in the body by the interaction of the polarized magnets with the permanent magnets.

In an embodiment, a device for use in a microfiber and/or nanofiber producing system includes: a body comprising one or more openings, a body cavity configured to receive material to be produced into a fiber; a coupling member, wherein the body is couplable to a driver through the coupling member; and one or more passages are formed extending through the body, wherein a liquid and/or gas is disposed in the one or more passages, and wherein, during use, the liquid and/or gas is transferred through the one or more passages. During use, rotation of the body causes material in the body cavity to be passed through one or more openings and ejected from one or more openings to produce microfibers and/or nanofibers.

During use, the liquid and/or gas may be transferred through the one or more passages. The one or more of the passages may be sealed. In one embodiment, the liquid is disposed in one or more of the passages, and the liquid partially fills the passage such that a substantial amount of the passage remains unfilled with the liquid. In another embodiment, the liquid disposed in one or more of the passages substantially fills the passage. Liquids that may be disposed in the passages include oil or a salt having a melting point between about 100° C. and 800° C. Air may also be disposed in the passages. The body of the fiber producing device may be substantially circular and one or more of the passages extend throughout the circular body. One or more of the passages may extend substantially homogenously throughout the entire body.

In one embodiment, a device for use in a microfiber and/or nanofiber producing system, the device includes: a body comprising one or more openings, wherein the body is configured to receive material to be produced into a fiber; and a thermally conductive material, different from the material used to form the body, extending through the body, wherein the thermally conductive material distributes heat through the body during use. During use, rotation of the body causes material in the body cavity to be passed through one or more openings and ejected from one or more openings to produce microfibers and/or nanofibers. The thermally conductive material is a substantially unitary substrate. The body, in an embodiment, is formed from a metal having a higher thermal conductivity than the material used to form the body. For example, the body may be formed from steel and the thermally conductive material may be formed from a metal having a higher thermal conductivity than steel.

In one embodiment, the body comprises a body cavity wherein the body cavity is configured to receive material to be produced into a fiber, and wherein the thermally conductive material is in the form of fins that span the body cavity. The fins may define a plurality of cavity access channels, wherein material enters the body cavity by passing through the cavity access channels. The body may further comprise capillary channels extending through a side wall to define an opening that extends from the body cavity to the exterior of the body, and wherein the cavity access channels have a diameter greater than the diameter of the capillary channels. The body may also include a material receiving channel coupled to the body cavity, wherein material is introduced into the body cavity through the material receiving channel. The capillary channels may extend through a side wall to define an opening that extends from the body cavity to the exterior of the body.

BRIEF DESCRIPTION OF THE DRAWINGS

Advantages of the present invention will become apparent to those skilled in the art with the benefit of the following detailed description of embodiments and upon reference to the accompanying drawings.

Figure 1A:
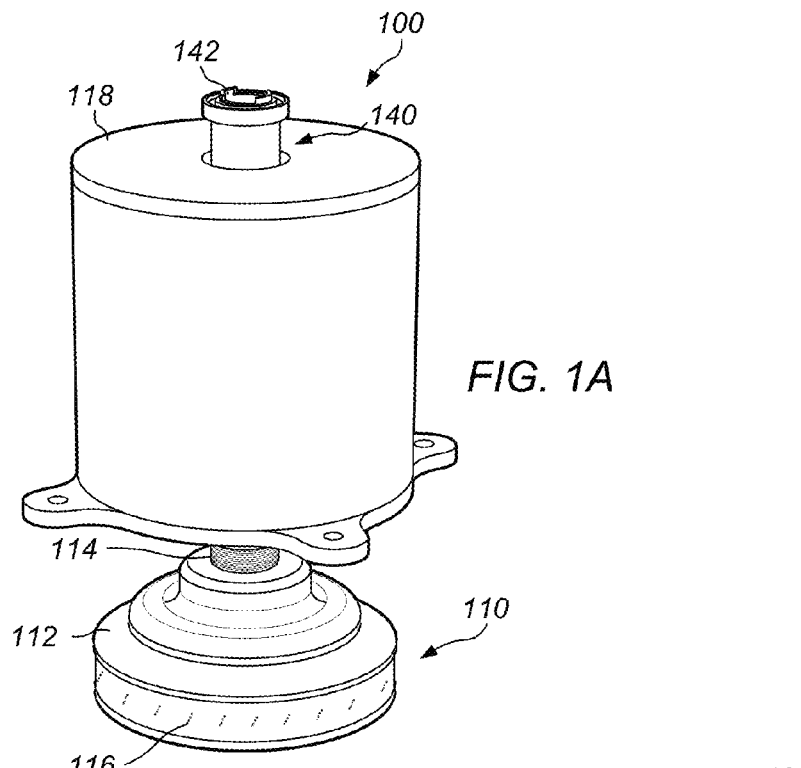
FIG. 1A depicts an embodiment of a fiber producing system with a driver mounted above the fiber producing device.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Published Patent Applications: 2009/0280325 entitled "Methods and Apparatuses for Making Superfine Fibers" to Lozano et al.; 2009/0269429 entitled "Superfine Fiber Creating Spinneret and Uses Thereof" to Lozano et al.; 2009/0232920 entitled "Superfine Fiber Creating Spinneret and Uses Thereof" to Lozano et al.; and 2009/0280207 entitled "Superfine Fiber Creating Spinneret and Uses Thereof" to Lozano et al., all of which are incorporated herein by reference.

An embodiment of a fiber producing system is depicted in FIGS. 1A-D. Fiber producing system 100 includes a fiber producing device 110. Fiber producing device 110 includes a body 112 and a coupling member 140. Body 112 comprises one or more openings 116 through which material disposed in the body may pass through during use. Fiber producing device 110 may be coupled to a driver 118 using a coupling member 140. Coupling member 140 couples fiber producing device 110 to driver 118, allowing the driver to rotate the fiber producing device during use.

In some embodiments, materials used to form fibers may conveyed into a body of a fiber producing device. In some embodiments, the material may be conveyed to the body under pressure in the form of a pressurized fluid. The material may be in the form of a solution or suspension in a suitable liquid, or the material may be in molten or melted form. Pressurized feed of materials into a fiber producing device may facilitate fiber production by forcing the materials through the openings in addition to the force provided by the spinning body of the device. A pressurized feed system may allow for produced fibers to be ejected from the openings at a higher velocity. A pressurized feed system may also allow for cleaning the fiber producing device by conveying gasses and/or solvents under pressure through the device to facilitate cleaning.

Figure 1B:
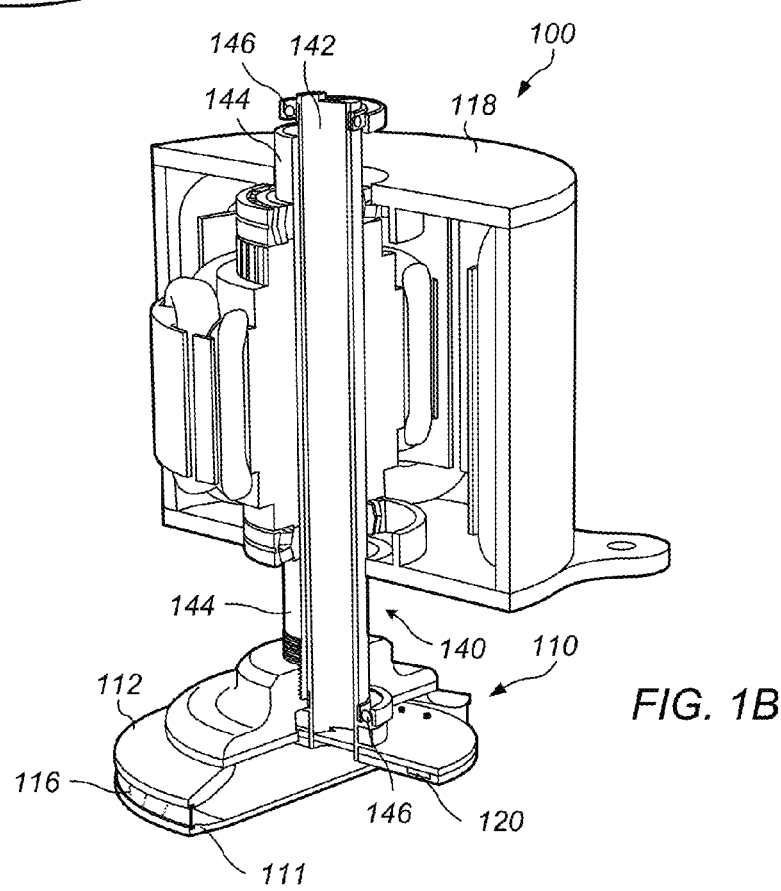
FIG. 1B depicts an embodiment of a cross section of a fiber producing system with a driver mounted above the fiber producing device.

In some embodiments, coupling member 140 includes a material delivery conduit 142 that may be used to convey materials to body 112. Material conduit 142 may convey materials through driver 118 (e.g., as depicted in FIG. 1B). Conveying materials through material delivery conduit 142 may allow the material to be delivered in an atmosphere other than air/oxygen. For example, using an inert gas to pressurize the fluid (e.g., nitrogen or argon) allows delivery of air or oxygen sensitive materials to the fiber producing device.

Coupling member 140 also includes a driving conduit 144. Driving conduit 144 is coupled to body 112 of the fiber producing device and driver 118. During use, operation of driver 118 causes driving conduit 144 to rotate which, in turn, causes fiber producing device 110 to rotate. In an embodiment, material delivery conduit 142 is disposed within driving conduit 144. During use, material delivery conduit 142 remains substantially stationary while driving conduit 144 rotates around the material delivery conduit. Coupling member 140 may include one or more bearings 146 which are positioned between driving conduit 144 and material delivery conduit 142. During use, bearings 146 provide a surface for driving conduit 144 to rotate around material delivery conduit 142. Bearings 146 also create a gap between driving conduit 144 and material delivery conduit 142. This gap helps to inhibit contact of driving conduit 144 with the material delivery conduit 142. The gap also serves as an insulating space which helps maintain the temperature of any material passing through material delivery conduit 142.

The interior cavity of the body may include angled or rounded walls 111 to help direct material disposed in body 112 toward openings 116. In some embodiments, an interior cavity of body 112 may have few or no angled or rounded walls to help direct material disposed in body 112 because such angled walls are not necessary due to the material and/or the speed at which the body is spinning during the process.

Figure 1C:
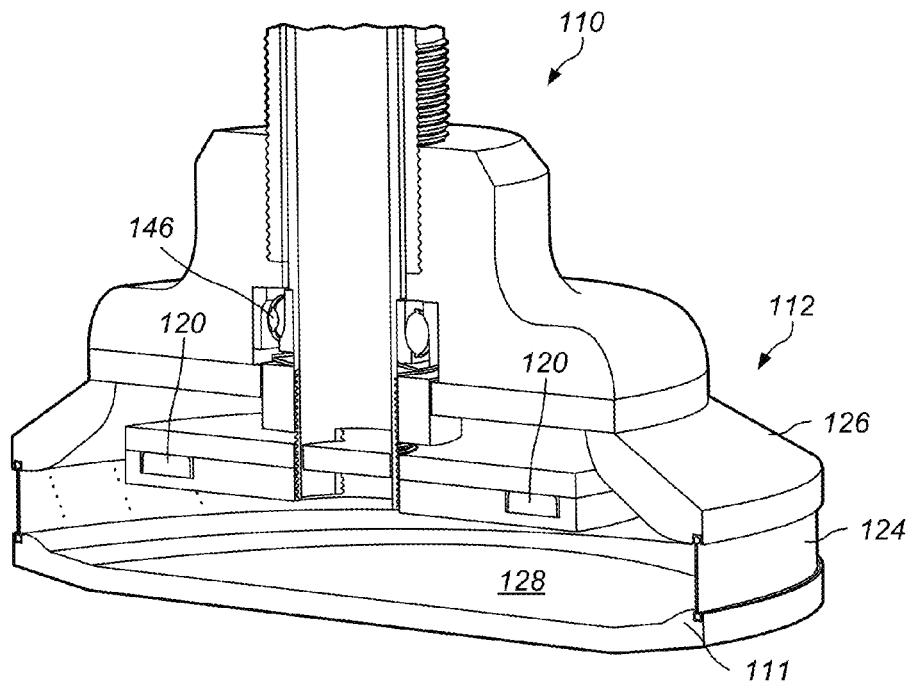
FIG. 1C depicts an embodiment of a cross section of a body of a fiber producing system.

In some embodiment, fiber producing device 110 may include internal heating device 120 (e.g., depicted in FIGS. 1B-1C). Heating device 120 may function to heat material conveyed into body 112 facilitating the production of fibers as the material is conveyed through one or more openings 116. Heating device 120 may heat material inductively or radiantly. In some embodiments, a heating device may heat material conductively, inductively or radiantly. In some embodiments, a heating device may heat material using RF, lasers, or infrared.

In some embodiments, heating device 120 maybe coupled to material delivery conduit and remain substantially motionless in relation to body 112 during use such that as body 112 spins, heating device 120 remains relatively motionless. In some embodiments, one or more wires (not shown) may be coupled to material delivery conduit to supply power to heating device 120.

In some embodiments, a driver may include a direct drive coupled to a body of a fiber producing device. A direct drive system may increase the efficiency of the fiber producing system. Direct drive mechanisms are typically devices that take the power coming from a motor without any reductions (e.g., a gearbox). In addition to increased efficiency a direct drive has other advantages including reduced noise, longer lifetime, and providing high torque a low rpm. Material delivery conduit 122 may in some embodiments convey materials through driver 118 (e.g., as depicted in FIG. 1B), in some embodiments driver 118 may include a direct driver.

Figure 1D:
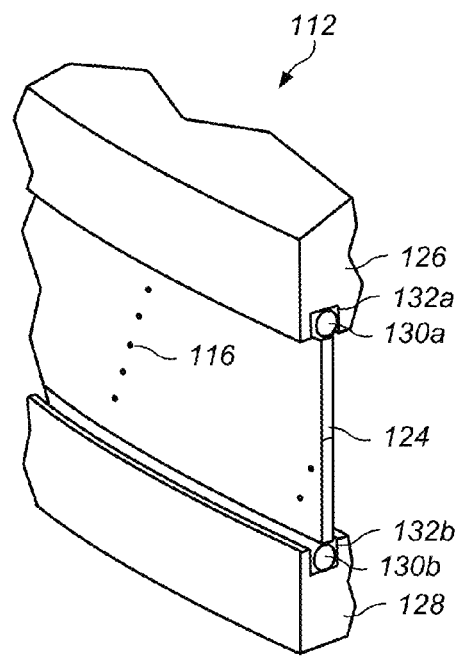
FIG. 1D depicts an embodiment of a cross section of a body of a portion of a sidewall, top member, and bottom member of a fiber producing system.

FIG. 1D depicts an embodiment of a cross section of a body 112 of a portion of a sidewall 124, top member 126, and bottom member 128 of a fiber producing system. Fiber producing system 100 includes a fiber producing device 110. Fiber producing device 110 includes a body 112 and a coupling member 140. Body 112 comprises one or more openings 116 through which material disposed in the body may pass through during use. Sidewall 124 may include a plurality of openings 116. In some embodiments, the plurality of openings may include a patterned array of openings. The patterned array may include a repeating pattern. The pattern may be such that no opening in the pattern is aligned vertically with another opening. The pattern may be such as to include a minimum distance between openings horizontally. In some embodiments, a pattern may inhibit entwining of fibers. Inhibition of fiber entwining or "roping" may result in a more consistent fiber product and better product.

Different patterns of openings may be desired and/or one or more openings may become clogged during normal use. In some embodiments, sidewall 124 of body 112 may be replaced without having to replace any other components of a fiber producing device. Sidewall 124 may be couplable to top member 126, and bottom member 128 of a fiber producing system. Edges 130a and 130b of a sidewall may fit within channels 132a and 132b of top member 126 and bottom member 128 respectively. Edges 130 may function to couple sidewall 124 to top member 126 and bottom member 128. In some embodiments, the edges of the sidewall may form a friction fit with the channels of the top and bottom members. In some embodiments, the edges of the sidewall may have a cross section similar to a cross section of the channels of the top and bottom members such that the edges may slide into the channels in a lateral direction but inhibited from being pulled out of the channels in any other direction.

Figure 2:
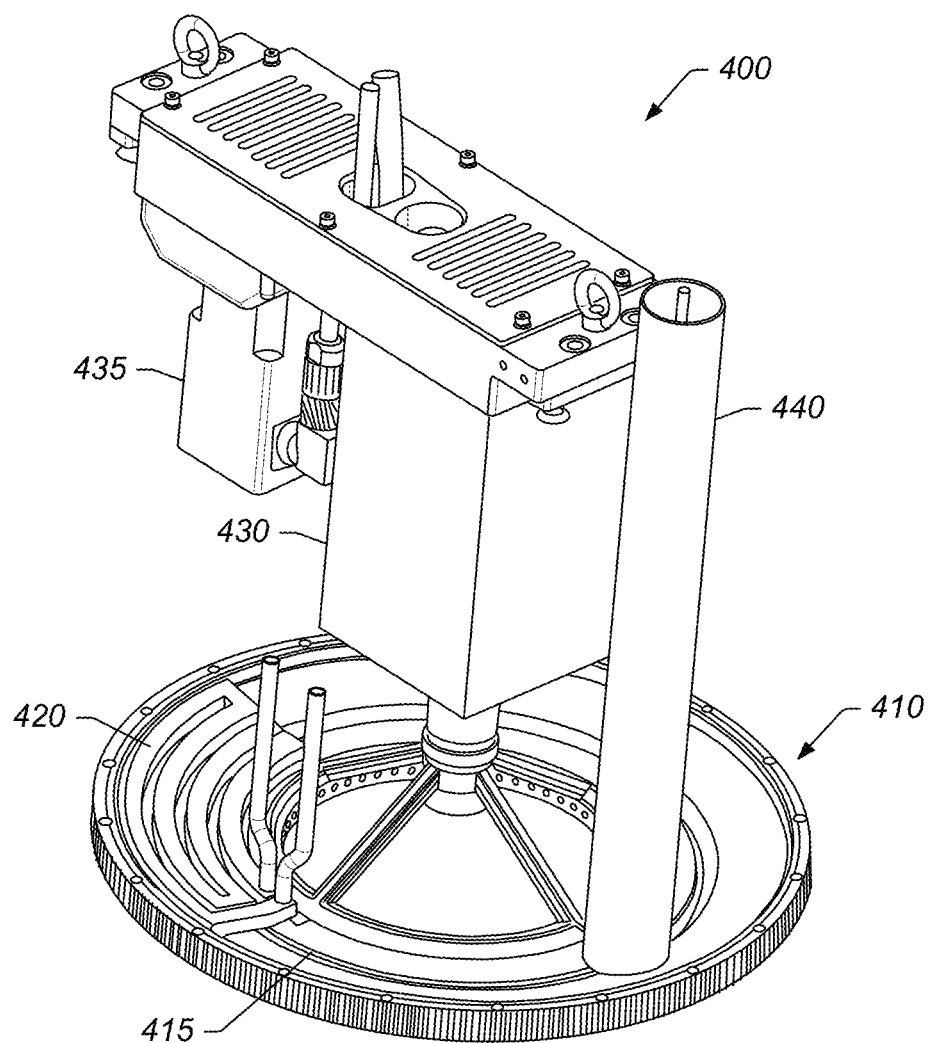
FIG. 2 depicts a perspective view of a fiber producing unit.

Another embodiment of a fiber producing device is depicted in FIG. 2. Fiber producing device 410 is part of a fiber producing unit 400 that may be disposed in a fiber producing system or module. Fiber producing unit 400, in an embodiment, includes a fiber producing device 410 comprising a body, defining a body cavity, and having a plurality of openings in the body cavity through which material is ejected during rotation of the body. An inductive heater 420 is positioned proximate to the body of fiber producing device 410 such that the inductive induces an electrical current in the body of fiber producing device 410. The body of fiber producing device thereafter becomes heated by the induced electrical current. In some embodiments, inductive heater 420 is stationary with respect to the body, while the body is being rotated.

Fiber producing unit 400 also includes a driver 430, which is capable of rotating the fiber producing body. Driver 430 is coupled to power supply 435, which supplies power to the driver and inductive heater 420.

Fiber producing device 410 includes a body cavity 415 which receives material to be used to form fibers (e.g., microfibers and nanofibers). A material transfer conduit 440 may be used to transfer material to the body cavity. Material transfer conduit 440 may transfer liquids to the fiber producing device (e.g., liquid suspensions, liquid solutions, and hot materials). In one embodiment, material transfer conduit 440 may be coupled to a hot melt system (e.g., material transfer device 330) and may be insulated to allow the transfer of heated material to the fiber producing device without substantial reduction in temperature of the material. For example, material transfer conduit 440 may be a hot runner conduit. Fiber producing device 410 includes a plurality of openings through which material is ejected to produce microfibers and/or nanofibers.

Figure 3:
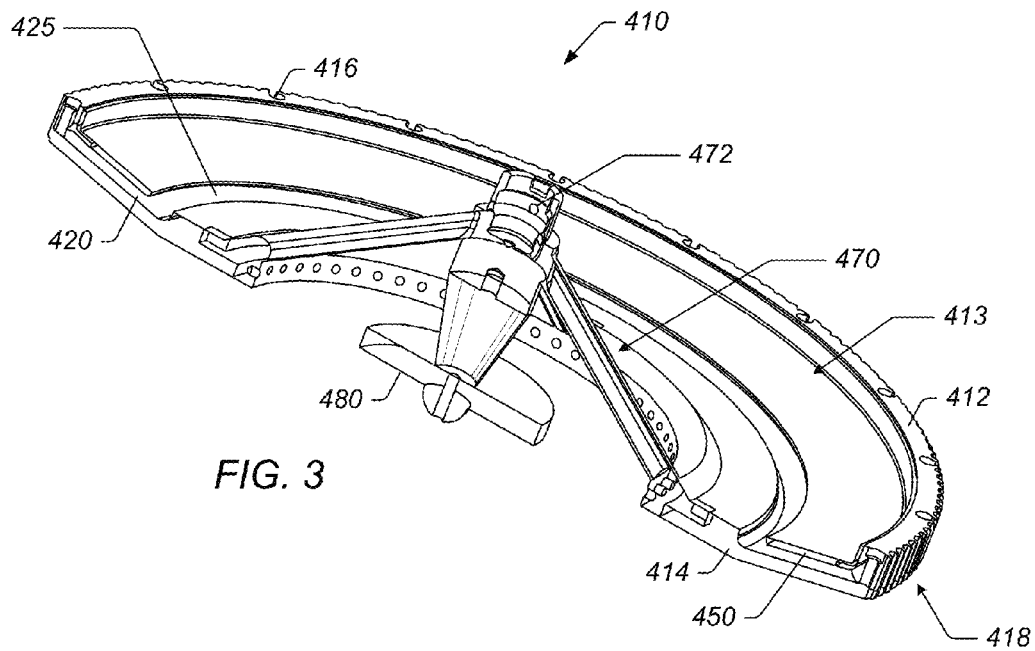
FIG. 3 depicts a perspective view of a fiber producing device of the fiber producing system of FIG. 2.

FIG. 3 depicts a cross-section view of a fiber producing device 410. Fiber producing device 410 includes a gear like body 418, having a plurality of orifices disposed in the groove of each gear like extension. Body 418 may be composed of a top member 412 and a bottom member 414. Top member 412 may be coupled to bottom member 414 using fasteners placed in recessed holes 416. Fasteners may be removable to allow the top member to be separated from the bottom member to allow cleaning of the fiber producing device. Top member 412 and bottom member 414 together define body cavity 415, in which the material to be formed into fibers is disposed. An opening 425 (e.g., in the form of a channel) extends through top member 412 to body cavity 420 to allow material to be placed into body cavity. Use of a channel that couples directly to the body cavity allows introduction of the material from the top face of the body while the body is being rotated.

Figure 5:
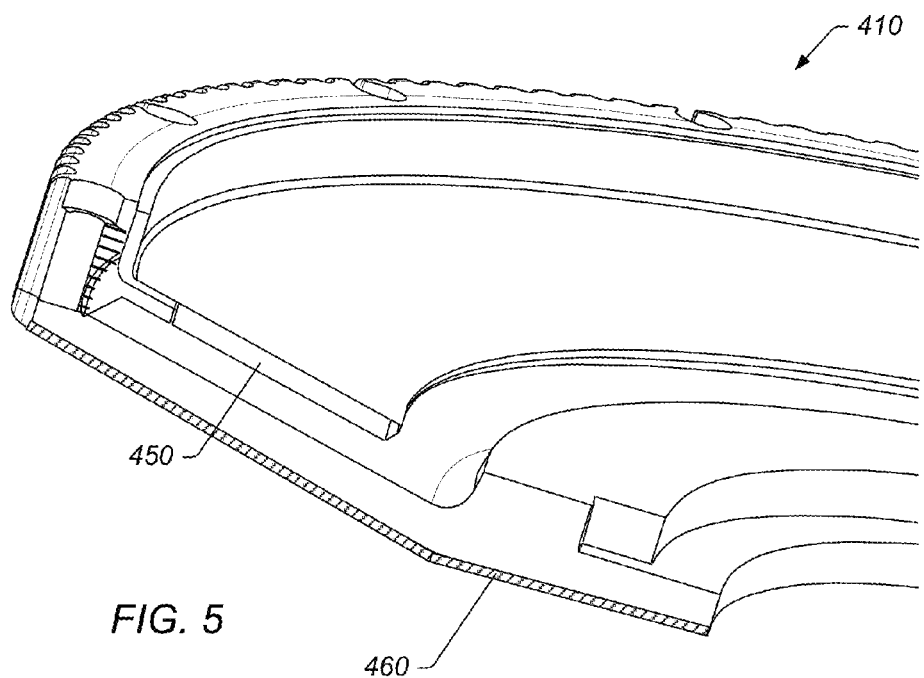
FIG. 5 depicts an expanded cross-section view of the body of a fiber producing device of the fiber producing system of FIG. 2.
Figure 6:
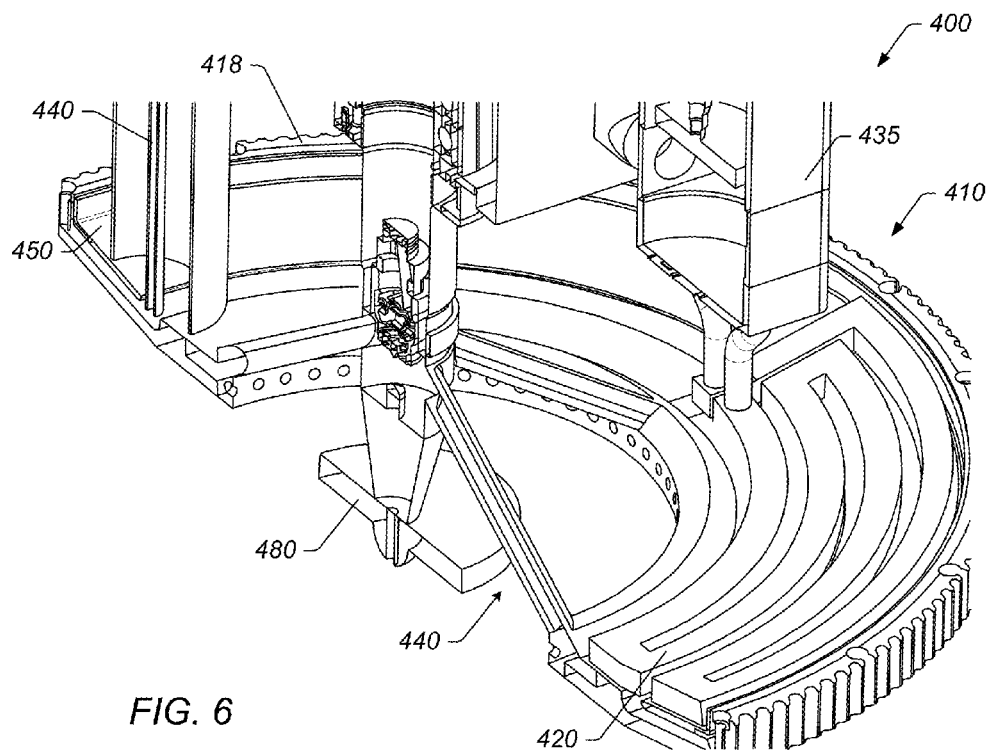
FIG. 6 depicts a cross-section view of the fiber producing system of FIG. 2.

In some embodiments, a shield 450 is disposed on top member 412. FIG. 5 is an expanded cross sectional view of the fiber producing device 410. Shield 450 is positioned such that the shield at least partially surrounds inductive heater coil 420, positioned proximate to the fiber producing device during use. Shield 450, in one embodiment, is shaped to cover the bottom of an inductive heating coil and the outer perimeter of the coil. Shield 450 may be formed from any material that is inductive frequency transparent and capable of withstanding the high temperature used, for example, during melt processing. An example of a shield material is TenCate Ultra high temp RS-55 resin. Other polymeric material may be used. Shield 450 is rapidly heated by the fiber producing device and serves as a barrier to inhibit material from collecting and accumulating on the cooler inductive coil. In an embodiment an insulating layer 460, depicted in FIG. 6, is disposed on a bottom exterior surface of the fiber producing device. Insulating layer 460 reduces heat loss from the body of the fiber producing device (when heated) and improves thermal uniformity of the material disposed within the body cavity.

Figure 4:
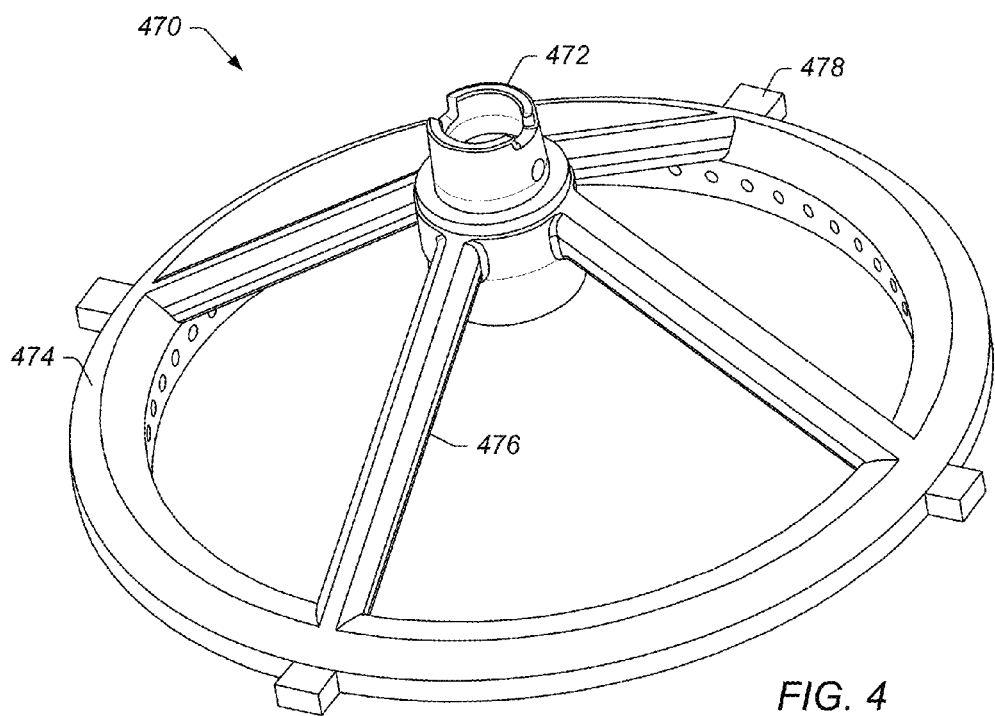
FIG. 4 depicts a perspective view of a coupling member of a fiber producing device of the fiber producing system of FIG. 2.

Fiber producing device 410 is coupled to a drive using coupling member 470. An embodiment of coupling member 470 is depicted in FIG. 4. Coupling member, in some embodiments, has an open hub design. An open hub design features a central coupler 472 which is connected to a coupling ring 474 through one or more arms 476, leaving a substantially empty area between the central coupler and the coupling ring. Coupling ring 474 may include one or more coupling tabs 478, which interlock with corresponding features on fiber producing device body 410 to removably couple the coupling member to the fiber producing body, as depicted in FIG. 3. This open hub design helps improve air flow management around the fiber producing device.

In some embodiments, it is desirable to control the flow of fibers being produced from the fiber producing device. For example, it may be desirable to direct fibers toward a substrate disposed below the fiber producing device. In some embodiment, a fan 480 may be coupled to the coupling member, as depicted in FIG. 3. Fan 480 may create a flow of gas in a downward direction, away from the fiber producing device when the fiber producing device is rotated. In some embodiments, fan 480 is removably coupled to coupling member such that the fan may be changed to accommodate the processing parameters of the system.

FIG. 6 depicts a cross-sectional view of an assembled fiber producing unit 400. The fiber producing unit includes a fiber producing device 410, which includes body 418, coupling member 470 and fan 480. Fiber producing unit 400 also includes inductive heating coil 420, power supply 435 for the inductive heating coil, and a material transfer conduit 440. Material transfer conduit is coupled to a material transfer device (not shown) which supplies material to the fiber producing device.

Figure 7:
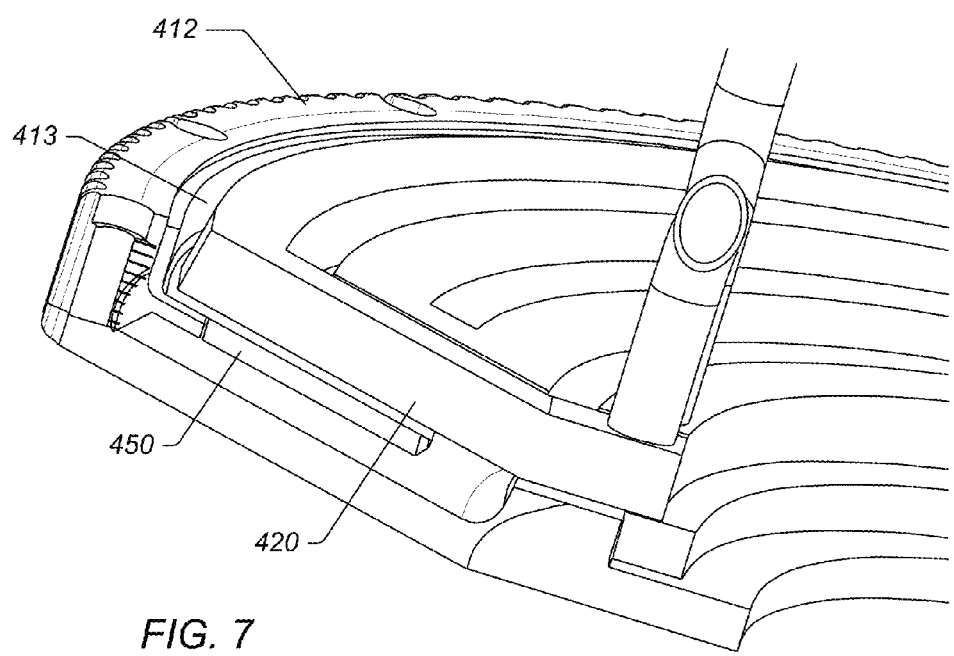
FIG. 7 depicts an expanded cross-section view of the body of a fiber producing device, with a proximate inductive heating coil.

FIG. 7 depicts an expanded view of fiber producing unit 400 of FIG. 2. Inductive heating coil 420, in one embodiment is positioned within the confines of a channel 413 defined along the upper surface of top member 412 of the body. As discussed above, a shield 450 is an inductive frequency transparent and serves as barrier that inhibits the deposition of material onto inductive heating coil 420. Channel 413, better seen in FIG. 9, has a shape that is complementary to the outer shape of inductive heating coil 420. When assembled, inductive heating coil 420 fits within channel 413 without touching any surface of the channel. Inductive coil 420 is at least partially encompassed by channel 413. During use, inductive heating coil 420 is disposed, at least partially, within channel 413 in a stationary position with respect to the fiber producing device body. Thus, when rotated, fiber producing device 410 spins about the inductive heating coil 420 without contacting the inductive heating coil. Channel 413 allows the inductive heating coil to be placed proximate to the fiber producing device body to induce a current in the body, creating heat.

An inductive heating system heats the fiber producing body, which is formed from an electrically conducting material (e.g., a stainless steel) by electromagnetic induction. Electromagnetic induction creates eddy currents (also called Foucault currents) within the fiber producing device body. Resistance of the fiber producing body to the induced current leads to Joule heating of the metal. The inductive heating system includes an inductive heating coil 420, through which a high-frequency alternating current (AC) is passed. The amount of heat generated in the fiber producing body is controlled by varying the inductive current induced in the fiber producing device body. In some embodiments, the shape or material used to form the fiber producing body may be adjusted to modify the induced current flow through the body. The shape of the body may therefore produce a homogenous distribution of current through the body to produce more homogenous heating of the body.

In another embodiment, an inductive heating system includes oppositely polarized magnets positioned on a surface of a fiber producing device body, and a permanent magnet magnetically coupled to the permanent magnets. During rotation of the fiber producing device, a current is induced in the body by the interaction of the polarized magnets positioned on the fiber producing device with the permanent magnets.

Figure 8:
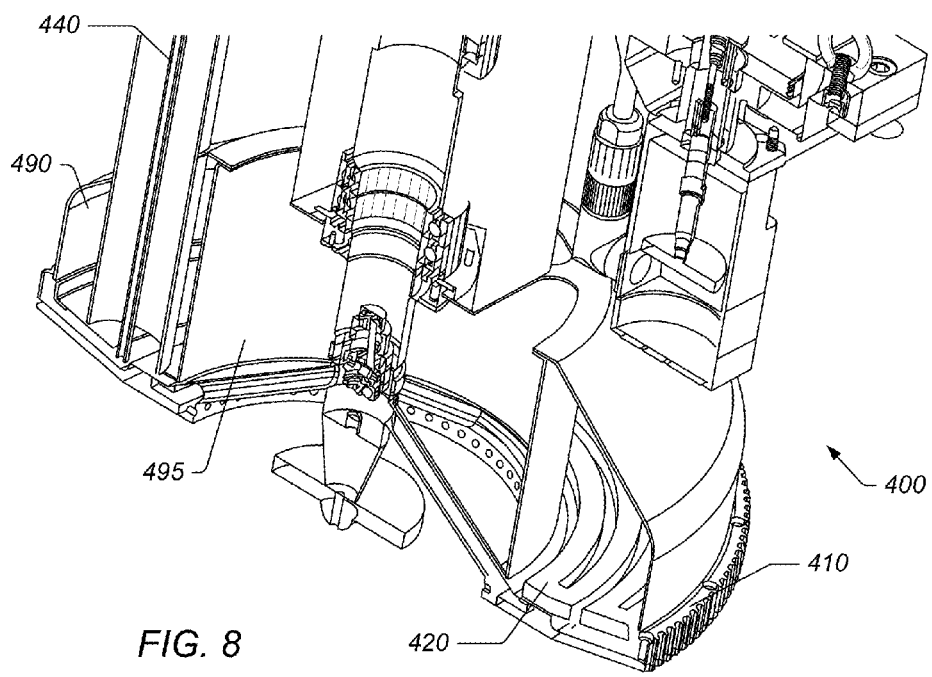
FIG. 8 depicts a cross-section view of a sealed fiber producing unit.

FIG. 8 depicts an embodiment of a sealed fiber producing unit 400. Sealed fiber producing unit includes a fiber producing device 410, inductive heater 420, and material transfer conduit 440, as well as other components as previously described. Sealed fiber producing device further includes sealing members 490 and 495 which form a seal which inhibits atmospheric gasses from entering the body cavity of the fiber producing device. Seal may include cut-out portions that allow inductive heater 420 and material transfer conduit 440 access to the fiber producing device. In some embodiments, seal is not necessarily "air-tight". In such a system, the material in the fiber producing body may be protected from atmospheric gasses by creating a positive pressure of inert gas within the sealed region defined by the sealing members. Inert gases include, but are not limited to gases such as nitrogen, helium and argon. The sealing members also help to inhibit heat loss from the fiber producing unit components. For example, the presence of sealing members may inhibit cooling of the fiber producing device due to heat transfer through atmospheric gasses.

Figure 9:
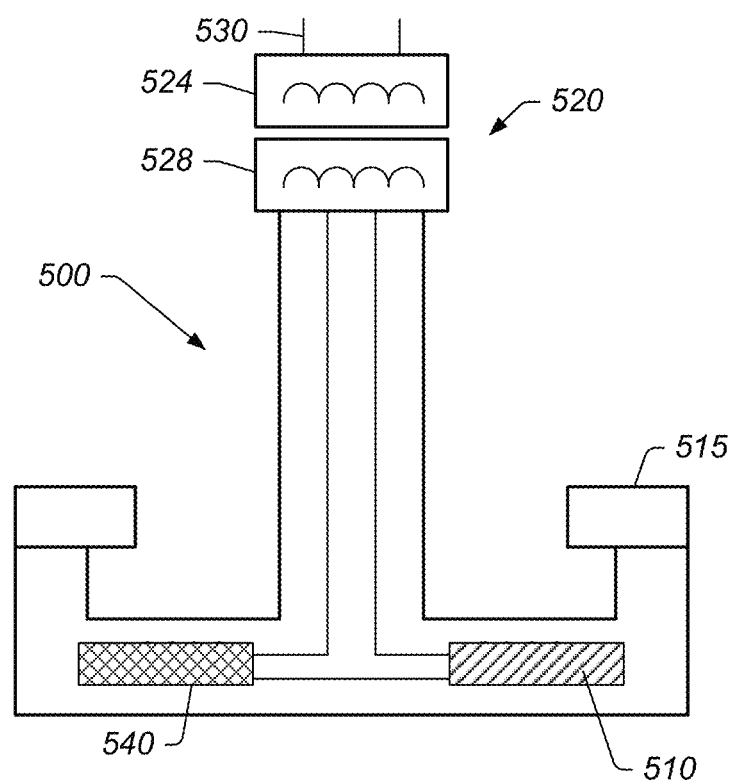
FIG. 9 depicts a cross-section view of fiber producing device that includes a rotary transformer.

In another embodiment, resistive heaters may be used to heat a fiber producing device. FIG. 9 depicts a schematic diagram of a fiber producing device 500 having one or more heating devices 510. Heating devices may be powered by use of a rotary transformer 520 coupled to connecting member 530 of fiber producing device 500. A rotary transformer is a transformer used to couple electrical signals between two parts that rotate in relation to each other. In an embodiment, a rotary transformer includes a primary winding 524 and a secondary winding 528 with each winding facing each other. Primary winding is mounted to a driver, while secondary winding is mounted to the connecting member. Suring use connecting member (and thus secondary winding) rotates with respect to the driver. Magnetic flux provides an electrical coupling from the primary winding to the secondary winding across an air gap, providing the mutual inductance that couples energy across the rotary transformer. The coupled energy is provided to the heating devices to create heat in the fiber producing body. In another embodiment, electrical brushes and slip rings can be used to couple power to resistive heaters, in place rotary transformer 520.

Heating devices 510 may be disposed partially or entirely within a body 515 of fiber producing device 500. Alternatively, heating devices 510 may be positioned on an outer surface of the fiber producing device 500. Heating devices 510, in some embodiments, may be resistive heaters. In another embodiment, heating devices may be in the form of a resistive film that is applied to an outer surface of the body of a fiber producing device. The resistive film may be deposited and patterned on the surface of the fiber producing device. Alternatively, a fiber producing device may be heated by passing a current through the body of the fiber producing device. In one embodiment, current obtained from rotary transformed is passed directly into the body of a fiber producing device. As discussed above, the resistance of the fiber producing body to the direct current being applied to the body leads to Joule heating of the body, causing the body to become heated. As discussed above, the shape and/or material used to form the fiber producing body may be used to create a desired heat profile in the fiber producing device.

In an embodiment, one or more temperature sensors may be used to control the temperature of the fiber producing device. In one embodiment, the temperature of a fiber producing device may be measured using temperature sensors 540 (e.g., resistive temperature sensors, infrared temperature sensors or thermographic temperature sensors) embedded in or disposed on a fiber producing device. The temperature sensors may be coupled to the measurement electronics through rotary transformer 520. A reference temperature sensor may be incorporated on the sensor side to compensate for transformer changes.

Alternatively, temperature sensors may also be coupled to the measurement electronics through electrical brushes and slip rings. A reference temperature sensor may be incorporated on the sensor side to compensate for transformer changes or changes to the resistance of the slip ring contacts.

A controller may be used to maintain an operating temperature of the fiber producing device. For example, a controller may be coupled to one or more heating devices (disposed proximate to, on, or within the fiber producing device) and one or more temperature sensors (disposed proximate to, on or within the fiber producing device). During use, one or more temperature sensors may provide the controller with information regarding the temperature of the fiber producing device. The controller may access the temperature of the fiber producing device and operate the heating devices, as needed, to maintain the proper operating temperature of the fiber producing device. Use of a feedback temperature loop will help to minimize temperature variations in the fiber producing device that would affect fiber formation.

Figure 10:
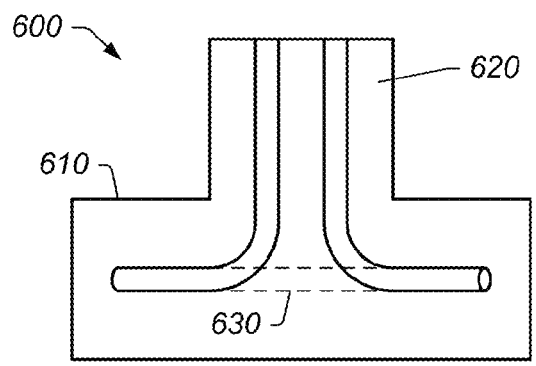
FIG. 10 depicts a cross-section schematic view of a fiber producing device having channels that carry a heat transfer fluid through the body.
Figure 11:
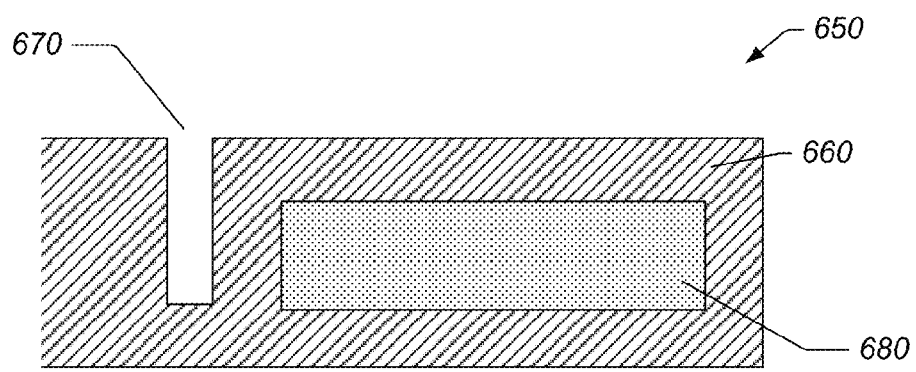
FIG. 11 depicts a cross-section schematic view of a fiber producing device having a heat transfer material disposed in the body.

In another embodiment, depicted in FIG. 10, a fiber producing device 600 includes a body 610 having one or more openings, a body cavity, and a coupling member 620. The body cavity is configured to receive material to be produced into a fiber. One or more passages 630 may be formed extending through the body, such that a liquid and/or gas may be distributed through one or more passages. During use the liquid and/or gas is transferred through the one or more passages to control the heat distribution within the fiber producing device. In some embodiments, the passages may be coupled to a circulation device that circulates a liquid and/or gas through the fiber producing device.

In a fiber producing device where energy is introduced into the top surface to heat the fiber producing device (e.g., from IR or other conductive heating devices), the heat has to flow through the body of the fiber producing device to heat the lower regions of the device. It is thus desirable to minimize the thermal impedance of heat flow through the fiber producing device. In one embodiment, depicted in FIG.

11, a fiber producing device 650 includes a body 660 having one or more openings, a body cavity 670, and a coupling member (not shown). Body cavity 670 is configured to receive material to be produced into a fiber. Fiber producing device may also include a thermally conductive material 680, different from the material used to form the body, extending through the body, wherein the thermally conductive material distributes heat through the body during use. The thermally conductive material, in one embodiment, is a material that has a higher thermal conductivity than the material used to form the body. For a fiber producing device formed from a stainless body, examples of thermally conductive materials having a higher thermal conductivity than the stainless tell body include, but are not limited to, silver, copper, gold, beryllium oxide, aluminum, aluminum nitride, brass, nickel, iron, bronze, magnesium, tungsten, and zirconium.

Figure 12:
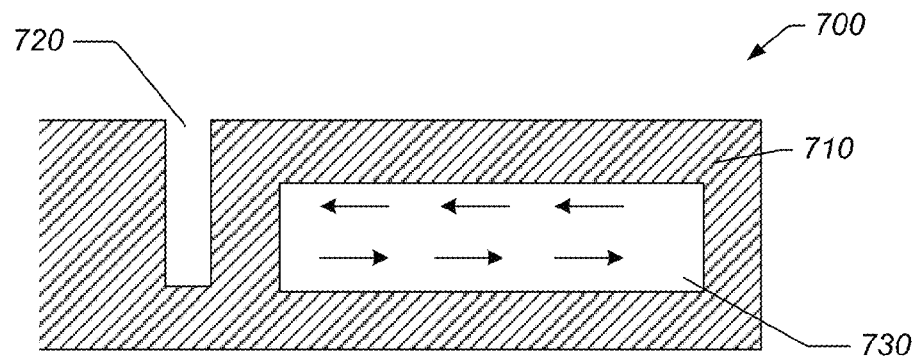
FIG. 12 depicts a cross-section view of a fiber producing device having an internal cavity disposed in the body with a heat transfer liquid disposed in the internal cavity.

The use of a thermally conductive material disposed in a body of a fiber producing device relies on conduction to transfer heat through the body. Convection can be used to transfer heat through a body more efficiently than conduction, if the convection flow is rapid enough. In another embodiment, convection heat transfer through the body of a fiber producing device may be achieved by the use of a liquid disposed in the body. FIG. 12 depicts a fiber producing device 700 that includes a body 710 having one or more openings, a body cavity 720, and a coupling member (not shown). Body cavity 710 is configured to receive material to be produced into a fiber. Fiber producing device 700 may also include a liquid filled cavity 730, which contains a heat transfer liquid. Heat transfer liquids may be any material that is a liquid at the operating temperature of the fiber producing device. Such materials include organic materials (e.g., hydrocarbons), salts having a melting point between about 100° C. and 800° C. (e.g., Dynalene M-2 made by Dynalene, Inc), metals, and metal alloys. During use, centrifugal force from the rapidly spinning body will create an artificial gravity in the radial direction much higher than the natural gravitational downward forces. A rapid convection will be created, driven by the warmer top and cooler bottom of the fiber producing device. In this manner, heat can be rapidly transferred from the top of the fiber producing device to the bottom of the fiber producing device, leading to a more homogenous temperature throughout the body of the fiber producing device.

Figure 13:
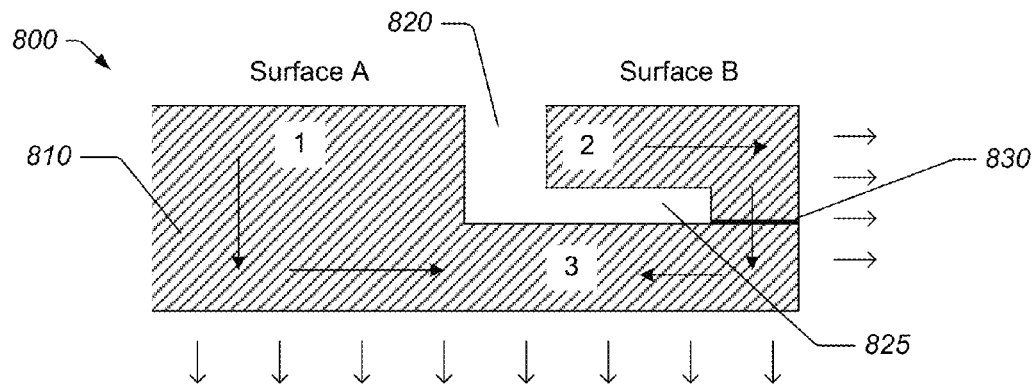
FIG. 13 depicts a cross-section schematic diagram depicting heat transfer through a fiber producing device.

Fiber producing devices used in melt centrifugal fiber production are typically axisymmetric with the exception of the capillary channel (opening) through which the material flows and is ejected. A simplified cross-sectional view of a fiber producing device 800 is shown in FIG. 13. Fiber producing device 800 includes a body 810 that includes regions 1, 2, and 3, and surfaces A and B. Channel 820, is formed in the body to allow material to be introduced into the body. Channel 820 couples to body cavity 825, which is coupled to capillary channel 830. Material disposed in channel 820 enters body cavity 825 and is transferred to capillary channel 830, where the material is ejected from the fiber producing device to form fibers. Fiber producing device 800 is typically heated by introducing energy into a portion of, or all of, surfaces A and B. Regions 1 and 2 of body 810 become areas of high temperature, while region 3 is at a temperature lower than regions 1 and 2. As shown by the arrows in FIG. 13, region 3 is heated by heat flowing from regions 1 and 2 to the lower temperature region 3. In addition, the heat imparted to body 810 is partially lost to the environment (denoted by the arrows moving away from the body), which creates different temperature regions throughout the body. Additionally, the heat energy lost to the surroundings as the heat energy moves from regions 1 and 2 to region 3 makes it harder to heat and maintain region 3 at the appropriate temperature. The resulting temperature difference is undesirable, since it may cause the material to become too viscous in the cooler regions and may cause the material to decompose (e.g., carbonize) in the high temperature regions.

Figure 14:
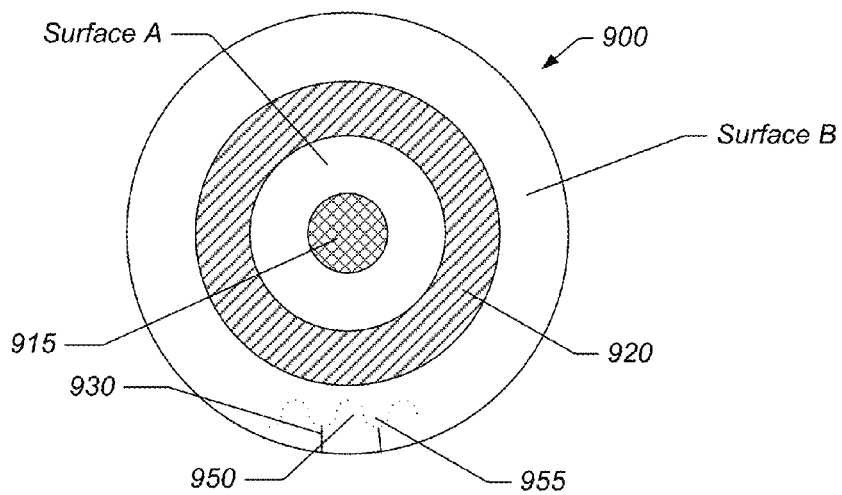
FIG. 14 depicts a top-view of a fiber producing device having heat transfer fins disposed in a body cavity.
Figure 15:
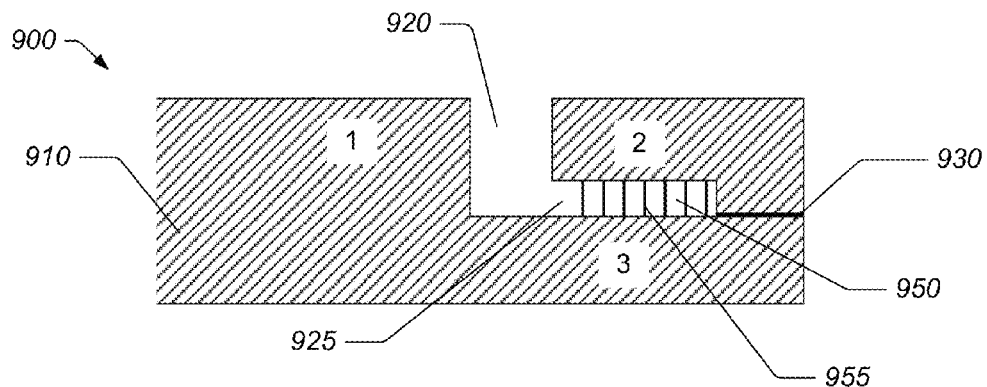
FIG. 15 depicts a cross-section view of the device of FIG. 14.

In one embodiment, depicted in FIGS. 14 and 15, the temperature difference between regions 2 and 3 of fiber producing device 900 may be reduced by incorporating heat transfer fins 950 that span body cavity 925 disposed between the regions. A fiber producing device 900 includes a coupling member 915, a material receiving channel 920, and a body cavity 925. Heat transfer fins 950 may be oriented in body cavity 925, thermally coupling regions 2 and 3 to each other. Heat transfer fins 950 may include a plurality of capillary access channels 955. Material entering channel 920 passes through heat transfer fins 950 via capillary access channels 955. After passing through capillary access channels the material enters capillary channels 930 and is ejected to produce fibers. Capillary access channels 955 may have a diameter greater than the diameter of capillary channels 930. In some embodiments, capillary access channels 955 have a diameter that is: at least 2×; at least 3×; at least 4×; at least at least 5×; at least 6×; at least 8×; or at least 10× the diameter of capillary channels 930, For example, if capillary access channels 955 has a diameter that is about 10 times the diameter of capillary channels 930, the capillary access channel would only give an impedance to flow per unit of $\frac{1}{100}^{th}$ of the impedance of flow of the capillary channel.

Heat transfer fins may play a dual role when incorporated into certain embodiments of a fiber producing device. While heat transfer fins transfer heat from the top surface to the bottom surface (and vice versa) they also take up space in the internal cavity of the fiber producing device so that the residence time of the material in the fiber producing device is reduced. It is desirable to reduce residence time to minimize the degradation of the polymer material while it is in the fiber producing device prior to being made into a fiber. Fins may be formed by manufacturing slots upstream of the orifices in a clamshell design or may be formed by drilling access holes upstream of the orifices in a one piece design as illustrated in the attachment.

Figure 16:
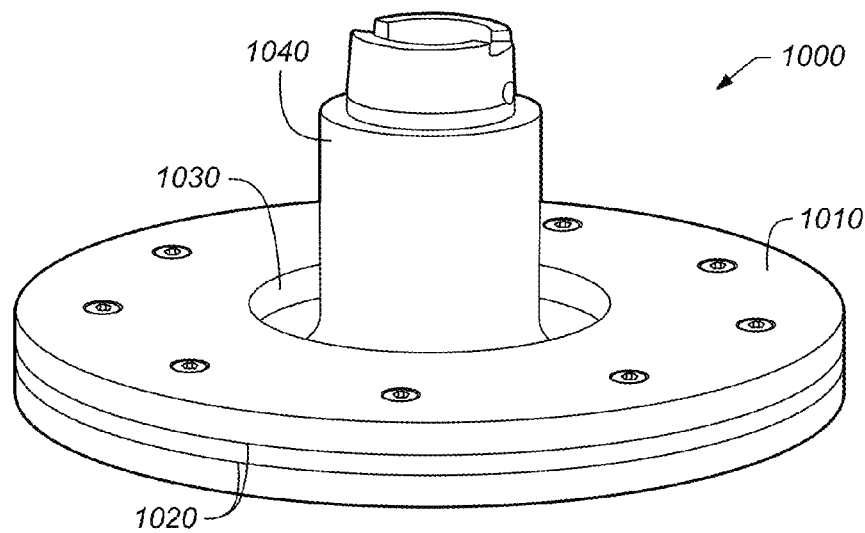
FIG. 16 depicts an alternate embodiment of a fiber producing device.
Figure 17:
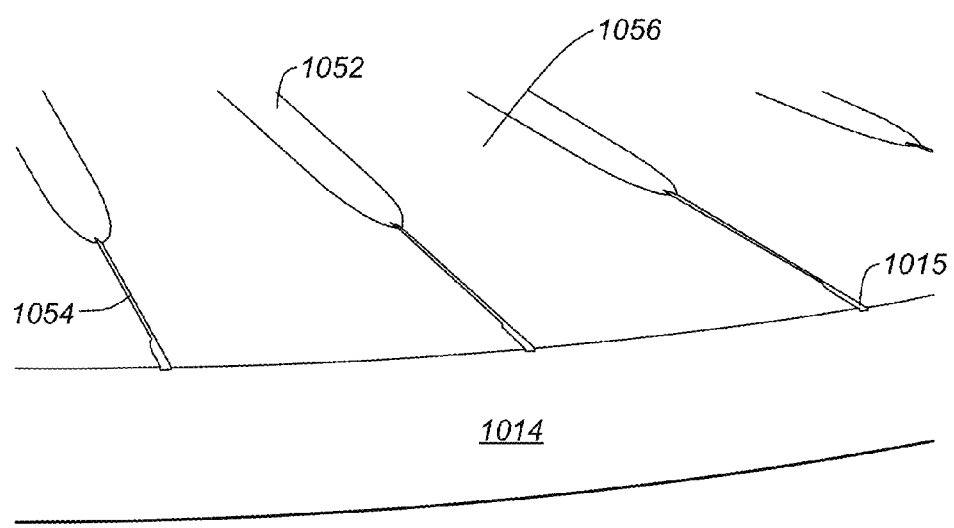
FIG. 17 depicts a close-up view of a groove of the fiber producing device depicted in FIG. 16.
Figure 18:
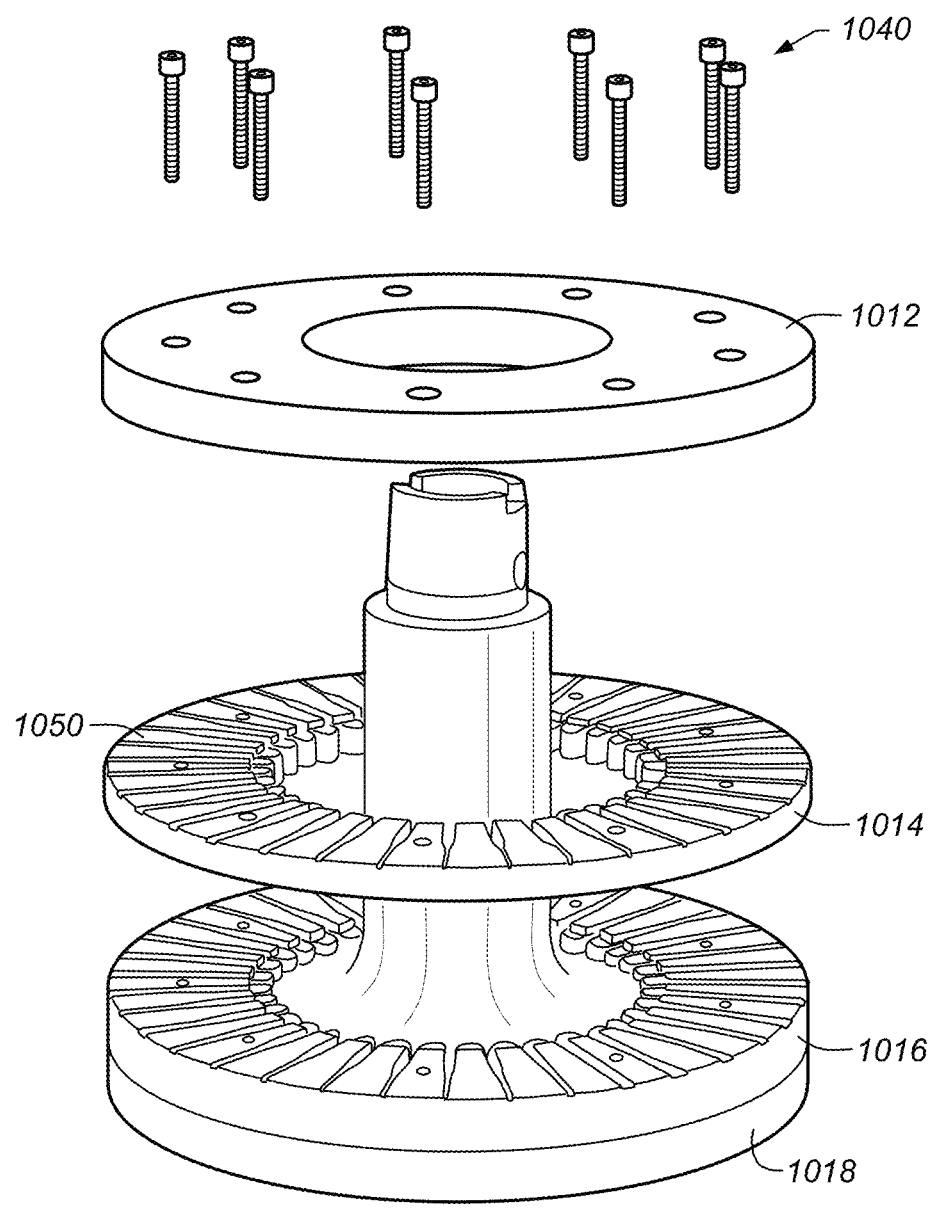
FIG. 18 depicts an exploded view of the fiber producing device of FIG. 16.

FIG. 16-18 depicts an embodiment of a fiber producing device having a plurality of heat transfer fins. Fiber producing device 1000 includes a body 1010, having a plurality of orifices disposed in slot 1020. Body 1010 may be composed of two or more members. In the embodiment depicted a grooved member 1014 is placed on grooved support 1018. Support 1018 provides a base upon which the grooved members may be stacked. Support 1018 also includes a coupling member 1030 which may be used to couple fiber producing device 1000 to a driver. While two grooved members are depicted, it should be understood that more or less grooved members may be used.

In one embodiment, fiber producing device 1000 includes a top member 1012 and a support member 1018 with one or more grooved members (1014, 1016) sandwiched between the top member and the support member. To assemble fiber producing device 1000, a first grooved member 1016 is placed on support 1018. A seal (not shown) may be disposed between grooved member 1016 and support 1018. A second grooved member 1014 is placed on first grooved member 1016. A seal (not shown) may be disposed between second grooved member 1014 and first grooved member 1016. When coupled together first grooved member 1016 and second grooved member 1014 define slot 1020, which runs around the circumference of the fiber producing device. Top member 1012 is placed on second grooved member 1014 and is fastened to support member 1018 by fasteners 1040, which extend through the top member, first, and second groove members into the support member. A seal (not shown) may be disposed between top member 1012 and second grooved member 1014. When coupled together top member 1012 and second grooved member 1014 define a slot 1020, which runs around the circumference of the fiber producing device.

When fiber producing device 1000 is assembled, a body cavity 1030 is defined by support member 1018, grooved members 1016 and 1014, and top member 1012. Material may be placed into body cavity 1060 during use. A plurality of grooves 1050 are formed in grooved members 1014 and 1016. When fiber producing device 1000 is rotated, material disposed in body cavity 1060 enters grooves 1050, which transports the material through the fiber producing device to be ejected through openings at slot 1020.

FIG. 17 depicts a close up projection view of grooves 1050. In an embodiment, a groove 1050 includes a trough 1015 and a capillary channel 1054, and a capillary access channel 1052, which is wider than the capillary channel. Fins 1056 define and separate the individual capillary channels and capillary access channels from each other. Fins provide heat transfer throughout the body as well as defining the narrower channels for material delivery. In an embodiment, when the fiber producing device is assembled, capillary channel 1054 forms a capillary tube that extends through the side wall of the fiber producing device. The material flows into the capillary access channel 1052 and into capillary channel 1054, then through the capillary channel into trough 1015 before exiting the body. In some embodiments, trough 1015 is a semi-circular channel that is not sealed by another portion of stacked fiber producing device 1000. Referring back to FIG. 16, slot 1020 represents a region of fiber producing device 1000 in which troughs 1015 reside. Having a wider, open, trough 1015 positioned next to a capillary channel 1054 removes the hold-back forces (e.g., non-slip condition at a wall) from a portion of the material as it exits the opening. Furthermore, the wide, open, second channel 1015 causes the material to accelerate while still in contact with the hot metal of the fiber producing device. This allows the material (especially a hot melt stream) to thin out as it accelerates, giving a smaller effective nozzle diameter, when the material leaves the fiber producing device.

Figure 19A:
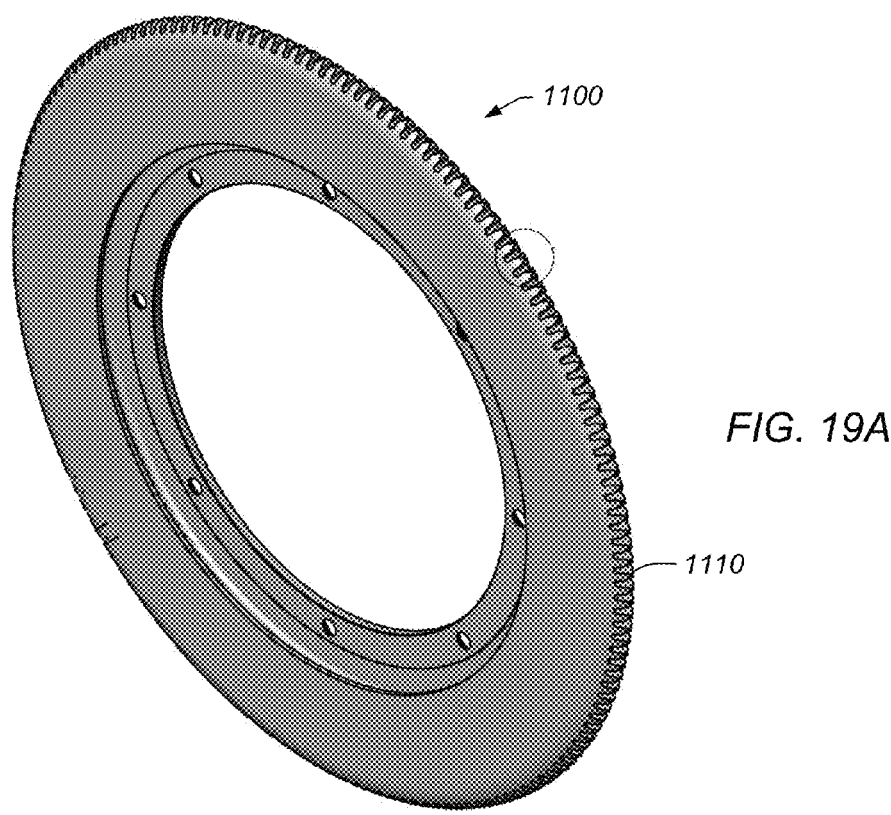
FIGS. 19A-C depict various views of a one-piece fiber producing having heat transfer fins.
Figure 19B:
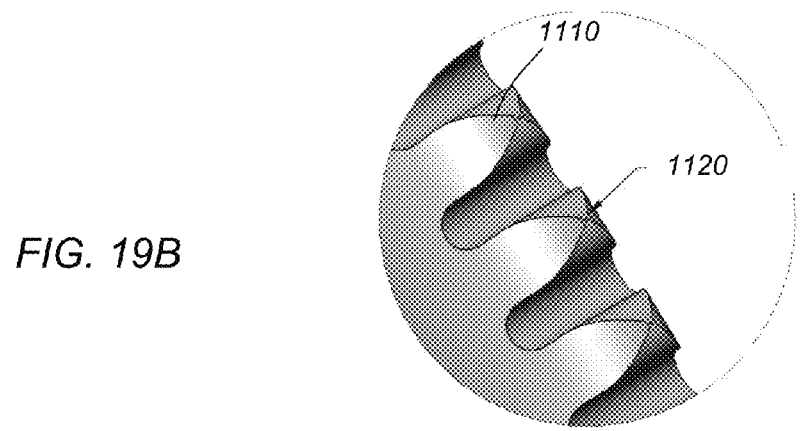
Figure 19C:
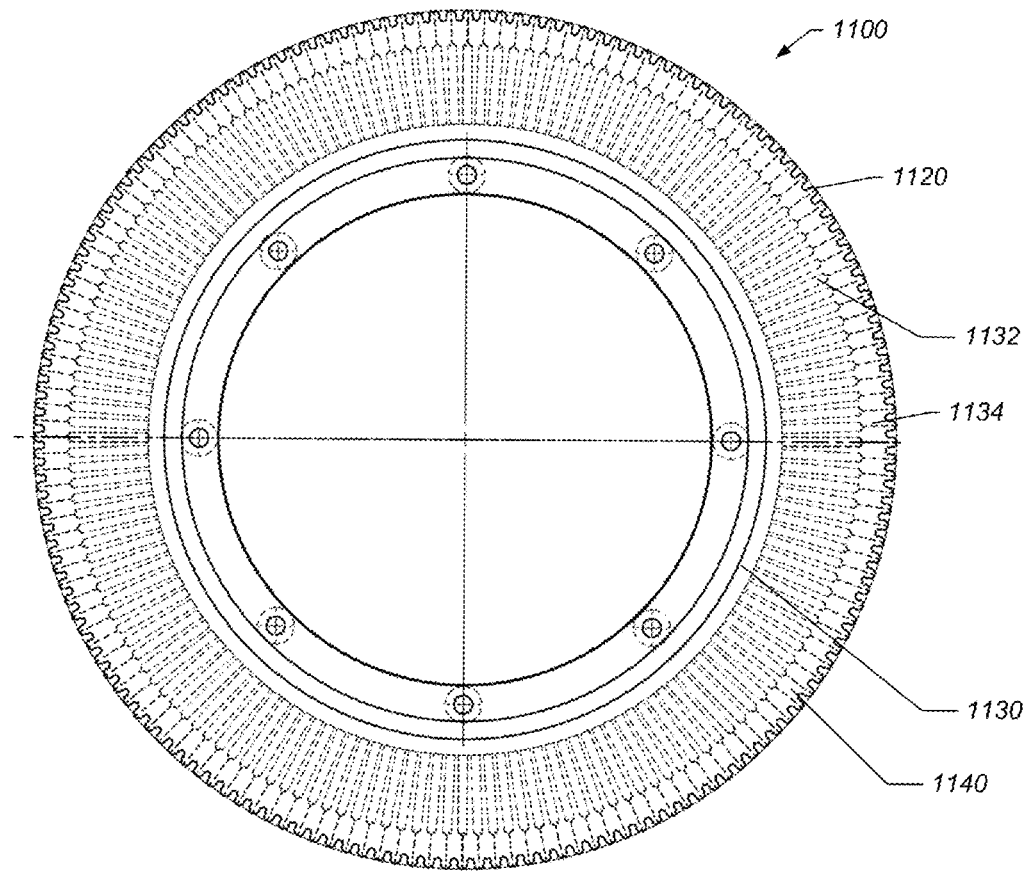

FIGS. 19A-19C depicts an alternate embodiment of a fiber producing device having fins. Similar to the fiber producing device of FIGS. 16-18, the device of FIG. 19 also includes a plurality of fins that define capillary channels running through the sidewalls of the fiber producing device. FIG. 19A depicts a projection view of a body 1100 of a fiber producing device. Body 1100 is in the form of a gear shaped body having a plurality of projections 1110. An opening 1120 is formed in each projection, as can be seen in inset diagram 19B. FIG. 19C depicts a cross section view of body 1110. In an embodiment, body includes an internal cavity 1130, a capillary access channel 1132, and a capillary channel 1134. Capillary channel 1134 extends to the end of the body to form the opening 1120. Capillary access channel 1132 is wider than capillary channel 1134. Fins 1140 define and separate the individual capillary channels 1134 and capillary access channels 1132 from each other. Fins provide heat transfer throughout the body as well as defining the narrower channels for material delivery. Capillary access channels 1132 may have a diameter greater than the diameter of capillary channels 1134. In some embodiments, cavity access channels 1132 have a diameter that is: at least 2×; at least 3×; at least 4×; at least at least 5×; at least 6×; at least 8×; or at least 10× the diameter of capillary channels 1134.

Figure 20:
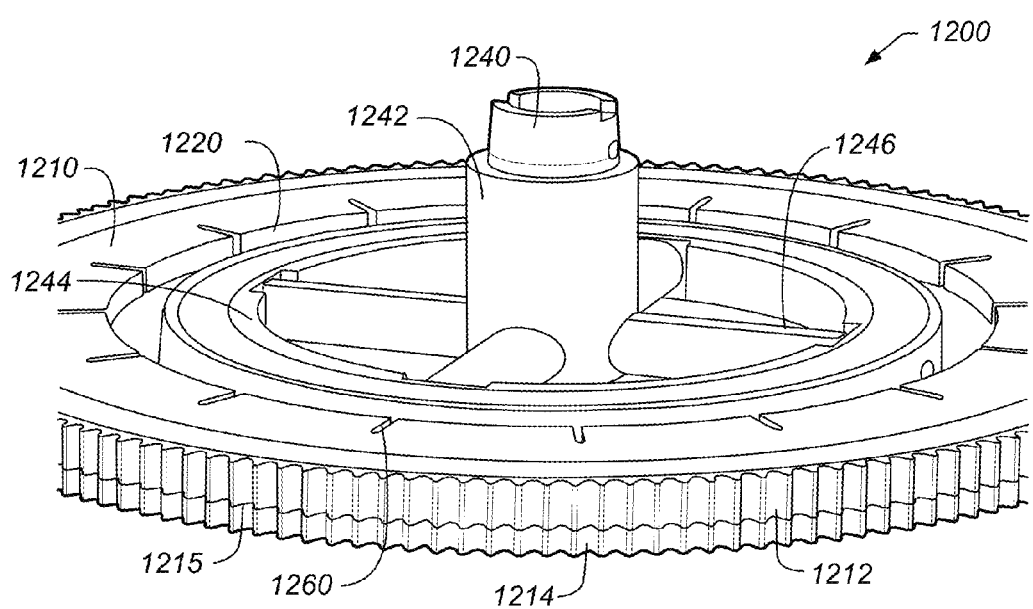
FIG. 20 depicts a gear fiber producing device.

FIG. 20 depicts a projection view of a fiber producing device 1200. Fiber producing device 1200 includes a gear like body 1210, having a plurality of orifices disposed in groove 1215 of each gear like extension. Body 1210 may be composed of a top member 1212 and a bottom member 1214. When coupled together top member 1212 and bottom member 1214 define groove 1215, which run around the circumference of the fiber producing device. Top member 1212 and bottom member 1214 together define a body cavity (not shown), in which the material to be formed into fibers is disposed. An opening 1220 extends through top member 1212 to the body cavity to allow material to be placed into body cavity. Use of a channel that couples directly to the body cavity allows introduction of the material from the top face of the body while the body is being rotated. Fiber producing device 1200 is coupled to a drive using coupling member 1240. Coupling member, in some embodiments, has an open hub design. An open hub design features a central coupler 1242 which is connected to a coupling ring 1244 through one or more arms 1246, leaving a substantially empty area between the central coupler and the coupling ring. This open hub design helps improve air flow management around the fiber producing device.

Fiber producing devices may be heated by induction, as described herein. Induction produces currents in the body of the fiber producing device which heats the device. It is often desirable to control the location of the heating by steering the induced currents to the regions where heat is desired. In FIG. 20, a fiber producing device has radial slots 1260 cut in the upper plate to push induced circumferential currents to the outer diameters of the device.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester (e.g., cellulose acetate, cellulose diacetate, cellulose triacetate, etc.), polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or microelectric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and non-woven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 1 inch to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a configuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, betalactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly (methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP). These polymers may be processed as either a melt or as a solution in a suitable solvent.

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or a ceramic oxides (e.g., PVP with germanium/palladium/platinum).

The fibers that are created may be, for example, one micron or longer in length. For example, created fibers may be of lengths that range from about 1 µm to about 50 cm, from about 100 µm to about 10 cm, or from about 1 mm to about 1 cm. In some embodiments, the fibers may have a narrow length distribution. For example, the length of the fibers may be between about 1 µm to about 9 µm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

After production of fibers is completed, it is desirable to clean the fiber producing device to allow reuse of the system. Generally, it is easiest to clean a fiber producing device when the material is in a liquid state. Once the material reverts to a solid, cleaning may be difficult, especially cleaning up small diameter nozzles and or needles coupled to the fiber producing device. The difficulty, especially with melt spinning, is that cleanup may also be difficult when the device is at an elevated temperature, especially if the fiber producing device needs to be cooled prior to handling for clean up. In some embodiments, a purge system may be couplable to fiber producing device when the fiber producing device is heated. A purge system may provide an at least partial seal between the purge system and the body of a fiber producing device such that a gas may be directed into the body, through the purge system, to create a pressurized gas inside of the body. The purge system, in some embodiments, includes a sealing member couplable to the body, a pressurized gas source, and a conduit coupling the pressurized gas source to the sealing member.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressings, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A microfiber and/or nanofiber producing system comprising:
    a fiber producing device comprising a body comprising one or more openings and a coupling member, wherein the body is configured to receive a material to be produced into a fiber;
    an inductive heater positioned proximate to the fiber producing device such that, during use, the inductive heater induces an electrical current in the body, wherein the body is heated by the induced electrical current; and
    a driver capable of rotating the fiber producing device, wherein the fiber producing device is couplable to the driver through the coupling member; and
    wherein the inductive heater is stationary with respect to the fiber producing device when the fiber producing device is rotated;
    wherein, during use, rotation of the fiber producing device causes material in the body to be passed through one or more openings and ejected from one or more openings to produce microfibers and/or nanofibers; and
    wherein the body comprises a channel, and wherein at least a portion of a coil of the inductive heater is positioned within the channel.

2. The system of claim 1, further comprising a shield composed of an inductive transparent material and disposed in the channel.

3. The system of claim 1, further comprising an insulative layer coupled to a bottom surface of the body.

4. The system of claim 1, wherein the body has features that modify the path of the induced current flow through the body.

5. The system of claim 1, wherein the shape of the body produces a homogenous distribution of current through the body.

6. A microfiber and/or nanofiber producing system comprising:
    a fiber producing device comprising a body comprising one or more openings and a coupling member, wherein the body is configured to receive a material to be produced into a fiber;
    an inductive heater positioned proximate to the fiber producing device such that, during use, the inductive heater induces an electrical current in the body, wherein the body is heated by the induced electrical current; and
    a driver capable of rotating the fiber producing device, wherein the fiber producing device is couplable to the driver through the coupling member; and
    wherein the inductive heater is stationary with respect to the fiber producing device when the fiber producing device is rotated;

wherein, during use, rotation of the fiber producing device causes material in the body to be passed through one or more openings and elected from one or more openings to produce microfibers and/or nanofibers; and wherein the inductive heater comprises oppositely polarized magnets positioned on a surface of the body, and one or more permanent magnets electrically coupled to the polarized magnets, wherein rotation of the body causes a current to be induced in the body by the interaction of the polarized magnets with the one or more permanent magnets.

7. The system of claim 1, wherein the body comprises one or more sidewalls together defining an internal cavity, wherein the one or more openings extend through at least one of the one or more sidewalls of the body, and wherein the inductive heater is radially inward of the sidewall of the body.

8. The system of claim 1, wherein the driver is positioned above the fiber producing device, when the fiber producing device is coupled to the driver.

9. The system of claim 1, wherein the fiber producing device is enclosed in a chamber, and wherein the environment inside the chamber is controllable.

10. A method of producing microfibers and/or nanofibers, comprising:
coupling a fiber producing device to a driver using a coupling member, the fiber producing device comprising a body comprising one or more openings;
placing material in the fiber producing device;
heating the body of the fiber producing device using an inductive heater, wherein the inductive heater is positioned proximate to the fiber producing device; and wherein the inductive heater induces an electrical current in the body, wherein the body is heated by the induced electrical current;
rotating the fiber producing device, wherein rotation of the fiber producing device causes material in the body to be passed through one or more openings to produce microfibers and/or nanofibers; and wherein the body is heated by the inductive heater during rotation of the fiber producing device; and
collecting at least a portion of the produced microfibers and/or nanofibers; and
wherein the coupling member further comprises a driving conduit coupled to the body of the fiber producing device, wherein the material delivery conduit is disposed within the driving conduit, and wherein the driving conduit rotates around the material delivery conduit during rotation of the fiber producing device.

11. The method of claim 10, further comprising:
heating the material to a temperature sufficient to at least partially melt the material;
heating the fiber producing device with the inductive heater to a temperature at or near a temperature sufficient to at least partially melt the material; and
conveying the heated material into the heated fiber producing device.

12. The method of claim 10, further comprising:
placing material in a fiber producing device; and
heating the fiber producing device with the inductive heater to a temperature at or near the temperature sufficient to at least partially melt the material disposed in the fiber producing device.

13. The method of claim 10, further comprising mixing the material with a solvent to produce a mixture of the material in a solvent, and introducing the mixture into the fiber producing device.

14. The system of claim 7, wherein the body and the openings rotate around the inductive heater.

* * * * *

UNITED STATES PATENT AND TRADEMARK OFFICE
CERTIFICATE OF CORRECTION

PATENT NO. : 9,981,439 B2
APPLICATION NO. : 13/960375
DATED : May 29, 2018
INVENTOR(S) : Stephen R. Kay et al.

Page 1 of 1

It is certified that error appears in the above-identified patent and that said Letters Patent is hereby corrected as shown below:

In the Claims

In Column 23, Line 3, Claim 6:
The word "elected" should be replaced with the word -ejected-.

Signed and Sealed this
Second Day of October, 2018

Andrei Iancu
*Director of the United States Patent and Trademark Office*